United States Patent
Utsunomiya et al.

(10) Patent No.: US 11,621,426 B2
(45) Date of Patent: Apr. 4, 2023

(54) MICRO-POROUS LAYER AND MANUFACTURING METHOD THEREFOR, GAS DIFFUSION ELECTRODE SUBSTRATE, AND FUEL BATTERY

(71) Applicant: Toray Industries, Inc., Tokyo (JP)

(72) Inventors: Masamichi Utsunomiya, Otsu (JP); Kentaro Kajiwara, Otsu (JP); Fumitaka Watanabe, Otsu (JP); Yasuaki Tanimura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 54 days.

(21) Appl. No.: 16/763,266

(22) PCT Filed: Nov. 21, 2018

(86) PCT No.: PCT/JP2018/042969
§ 371 (c)(1),
(2) Date: May 12, 2020

(87) PCT Pub. No.: WO2019/107241
PCT Pub. Date: Jun. 6, 2019

(65) Prior Publication Data
US 2020/0313200 A1    Oct. 1, 2020

(30) Foreign Application Priority Data

Nov. 29, 2017 (JP) ............................. JP2017-228745
Apr. 26, 2018 (JP) ............................. JP2018-084883

(51) Int. Cl.
*H01M 4/02* (2006.01)
*H01M 4/86* (2006.01)
*H01M 4/88* (2006.01)

(52) U.S. Cl.
CPC ....... *H01M 4/8626* (2013.01); *H01M 4/8885* (2013.01)

(58) Field of Classification Search
CPC ..................................................... H01M 4/02
See application file for complete search history.

(56) References Cited

U.S. PATENT DOCUMENTS

| | | |
|---|---|---|
| 2004/0134291 A1 | 7/2004 | Roth |
| 2004/0241078 A1 | 12/2004 | Inoue et al. |
| 2006/0037416 A1 | 2/2006 | Roth |
| 2014/0087272 A1 | 3/2014 | Takeuchi et al. |
| 2015/0372332 A1* | 12/2015 | Okano ............... H01M 8/0241 429/534 |
| 2016/0322646 A1 | 11/2016 | Kajiwara et al. |
| 2016/0365583 A1* | 12/2016 | Kongkanand ....... H01M 4/8807 |

FOREIGN PATENT DOCUMENTS

| | | |
|---|---|---|
| CN | 1780038 A | 5/2006 |
| CN | 101817518 A | 9/2010 |
| CN | 103460467 A | 12/2013 |
| CN | 105829593 A | 8/2016 |
| CN | 106299398 A | 1/2017 |
| JP | 2000353528 A | 12/2000 |
| JP | 2003115302 A | 4/2003 |
| JP | 2006522996 A | 10/2006 |
| JP | 2009238388 A | 10/2009 |
| JP | 2012054111 A | 3/2012 |
| JP | 2013164896 A | 8/2013 |
| WO | 03034519 A1 | 4/2003 |
| WO | 2009116157 A1 | 9/2009 |

OTHER PUBLICATIONS

International Search Report and Written Opinion for International Application No. PCT/JP2018/042969, dated Feb. 19, 2019, 5 pages.
Chinese Office Action for Chinese Application No. 201880065646.4, dated Nov. 22, 2021 with translation, 20 pages.

* cited by examiner

*Primary Examiner* — Jacob B Marks
(74) *Attorney, Agent, or Firm* — RatnerPrestia

(57) ABSTRACT

The present invention provides a micro-porous layer which provides a fuel battery having high productivity, high power generation performance, and high durability. The present invention provides a micro-porous layer including fibrous carbohydrate having a fiber diameter of 5 nm-10 μm and an aspect ratio of 10 or more. The carbohydrate has an oxygen/carbon element ratio of 0.02 or more.

13 Claims, No Drawings

MICRO-POROUS LAYER AND MANUFACTURING METHOD THEREFOR, GAS DIFFUSION ELECTRODE SUBSTRATE, AND FUEL BATTERY

CROSS REFERENCE TO RELATED APPLICATIONS

This is the U.S. National Phase application of PCT/JP2018/042969, filed Nov. 21, 2018, which claims priority to Japanese Patent Application No. 2017-228745, filed Nov. 29, 2017 and Japanese Patent Application No. 2018-084883, filed Apr. 26, 2018, the disclosures of each of these applications being incorporated herein by reference in their entireties for all purposes.

FIELD OF THE INVENTION

The present invention relates to a micro-porous layer used in a fuel battery, and more particularly to a micro-porous layer suitable for, among fuel batteries, a solid polymer electrolyte fuel battery used as a power source for a fuel cell vehicle and the like.

BACKGROUND OF THE INVENTION

The solid polymer electrolyte fuel battery is expected to be widely used as clean energy because of its high energy efficiency and the fact that it discharges only water.

A basic configuration of the solid polymer electrolyte fuel battery includes a polymer electrolyte membrane, a catalyst layer formed on each side of the polymer electrolyte membrane, a gas diffusion electrode substrate formed outside the catalyst layer, and two separators sandwiching them.

A fuel battery is a system for electrically extracting energy generated when hydrogen reacts with oxygen to produce water. Thus, under an increased electrical load, that is, under a large current taken out to the outside of the battery, a large amount of water (water vapor) is produced. The water vapor condenses into water droplets at low temperature to block pores of the gas diffusion electrode substrate, and thus reduces the amount of gas (oxygen or hydrogen) supplied to the catalyst layer. If all the pores are finally blocked, power generation may stop (this phenomenon is called flooding).

As the gas diffusion electrode substrate, specifically, a conductive porous substrate such as carbon felt, carbon paper, or carbon cloth made of carbon fibers is used; however, condensation of water vapor generates large water droplets and tends to cause flooding, since the fibers of the conductive porous substrate are coarsely woven. Thus, a layer (also referred to as a micro-porous layer) containing conductive fine particles, such as a conductive material, is sometimes provided on the conductive porous substrate.

The micro-porous layer is generally formed by drying and sintering ink in which a conductive material, fluororesin particles as a binder thereof, and a surfactant are dispersed in water. Here, since a melting point of the fluororesin is much higher than a drying temperature of the ink, the conductive material largely moves and aggregates during drying to cause a crack, and even if the fluororesin melts and moves by sintering, the crack sometimes cannot be repaired.

The cracks formed in the micro-porous layer tend to be a starting point of aggregation of water vapor, so that flooding is likely to occur, and performance tends to be low. Since an electrolyte membrane swells and contracts depending on operating conditions, this causes cracks to expand and durability to decrease due to damage to the electrolyte membrane. In particular, when a process of applying a catalyst coating liquid on a micro-porous layer to form a catalyst layer is employed, the catalyst coating liquid cannot be uniformly applied.

Patent Document 1 discloses a technique for forming a micro-porous layer using fibrous carbon as a conductive material.

Patent Document 2 discloses a technique for forming a micro-porous layer using a high molecular weight water repellent.

Patent Document 3 discloses a technique for forming a micro-porous layer by adding a water-soluble resin.

Patent Document 4 discloses a technique for forming a micro-porous layer by adding a thermosetting resin.

PATENT DOCUMENTS

Patent Document 1: Japanese Patent Laid-open Publication No. 2003-115302
Patent Document 2: Japanese Patent Laid-open Publication No. 2012-54111
Patent Document 3: Japanese Patent Laid-open Publication No. 2013-164896
Patent Document 4: Japanese Patent Laid-open Publication No. 2009-238388

SUMMARY OF THE INVENTION

The technique described in Patent Document 1 has the advantage that fibrous carbon is unlikely to crack during drying and sintering because fibrous carbons are more easily hooked on each other as compared to a particle-shaped conductive material. However, the fibrous carbon is likely to pierce into an electrolyte membrane, which may cause a local short circuit. When fibrous carbon is used, a pore size in a micro-porous layer tends to be large as compared to a case of using the same volume of the particle-shaped conductive material. When the process of applying a catalyst coating liquid on the micro-porous layer to form a catalyst layer is employed, the catalyst coating liquid cannot be applied uniformly.

According to the technique described in Patent Document 2, since the molecular weight of the water repellent is high, a function as a binder is high in a sintering step, and cracks are unlikely to occur. However, since the water repellent does not melt at the evaporation temperature of water as a dispersion medium, there is a problem that cracks during drying cannot be suppressed. Since the molecular weight is large, a melt viscosity is high, and a rate of wetting and spreading on a carbon fiber surface during the sintering step is low, so that water repellency is insufficient. Thus, when the process of applying a catalyst coating liquid on a micro-porous layer to form a catalyst layer is employed, the catalyst coating liquid cannot be applied uniformly.

According to the technique described in Patent Document 3, the water-soluble resin chains conductive material particles together, whereby cracks are unlikely to occur during drying and sintering. However, water repellency is insufficient because the water-soluble resin remains in the micro-porous layer, and when the process of applying a catalyst coating liquid on the micro-porous layer to form a catalyst layer is employed, the catalyst coating liquid cannot be applied uniformly.

According to the technique described in Patent Document 4, the thermosetting resin is heated to form a crosslinked structure, whereby cracks are unlikely to occur during drying and sintering. However, water repellency is insufficient because the thermosetting resin remains in the micro-porous layer, and when the process of applying a catalyst coating liquid on the micro-porous layer to form a catalyst layer is employed, the catalyst coating liquid cannot be applied uniformly.

Thus, an object of the present invention is to provide a micro-porous layer having high productivity and improving power generation performance and durability when used in a fuel battery.

The present invention according to exemplary embodiments provides a micro-porous layer containing a fibrous carbide having a fiber diameter of 5 nm or more and 10 μm or less and an aspect ratio of 10 or more, and in this micro-porous layer, an oxygen/carbon element ratio of the carbide is 0.02 or more.

In order to solve the above problems, the present invention according to exemplary embodiments provides a micro-porous layer having a contact angle with a droplet obtained by mixing 2-propanol and water at a ratio of 1:2 of 80° or more, containing a conductive material having an aspect ratio of less than 20, and including substantially no crack.

The present invention according to exemplary embodiments provides a method for manufacturing a micro-porous layer, which includes drying ink containing a conductive material having an aspect ratio of less than 20 and a crack suppressing material having an aspect ratio of 2 or more, and then performing a heat treatment at a temperature higher than a temperature in the drying step to decompose and remove the crack suppressing material.

By using the micro-porous layer of the present invention, a fuel battery with high productivity, high power generation performance and high durability can be obtained.

DETAILED DESCRIPTION OF EMBODIMENTS OF THE INVENTION

<Micro-porous layer>

The present invention according to exemplary embodiments provides a substantially crack-free micro-porous layer whose contact angle with a droplet obtained by mixing 2-propanol and water at a ratio of 1:2 is 80° or more and which contains a conductive material having an aspect ratio of less than 20.

In the micro-porous layer of an embodiment of the present invention, the contact angle with a droplet obtained by mixing 2-propanol and water at a ratio of 1:2 is preferably 80° or more. A large contact angle with a droplet obtained by mixing 2-propanol and water at a ratio of 1:2 shows a tendency which hardly serves as a starting point for aggregation of water vapor, and flooding is unlikely to occur. When the process of applying a catalyst coating liquid on a micro-porous layer to form a catalyst layer is employed, the catalyst coating liquid hardly permeates the micro-porous layer and can be applied uniformly. Thus, the contact angle with the droplet is preferably 95° or more, more preferably 105° or more. The upper limit is not limited, but is usually 160° or less.

The contact angle with the droplet in the present invention is taken as an average value measured by dropping 5 μL of water droplets, obtained by mixing 2-propanol and water at a ratio of 1:2, at randomly selected 10 locations on the micro-porous layer in an environment of a temperature of 20° C. and a humidity of 60%. The contact angle can be measured by, for example, an automatic contact angle meter DM-501 (manufactured by Kyowa Interface Science Co., Ltd.).

The micro-porous layer of the present invention is preferably substantially free from cracks. When there is no crack, flooding is unlikely to occur because a starting point for aggregation of water vapor hardly occurs. When an electrolyte membrane swells and contracts depending on operating conditions, it is easy to suppress deformation in a plane direction. In addition, when the process of applying a catalyst coating liquid on a micro-porous layer to form a catalyst layer is employed, the catalyst coating liquid can be uniformly applied. A "substantially crack-free" micro-porous layer in the present invention refers to a micro-porous layer of the level where cracks cannot be visually clearly recognized. In this micro-porous layer, for example, observation is made in five or more visual fields in which a region larger than a 1 mm square with a surface of the micro-porous layer magnified 100 or more times with an optical microscope is selected arbitrarily, and when the number of cracks having a length of 100 μm or more is measured, the number converted per $cm^2$ is $50/cm^2$ or less. The number is preferably $15/cm^2$ or less, more preferably $5/cm^2$ or less. As the optical microscope, for example, a digital microscope M205C (manufactured by Leica Microsystems) can be used.

The micro-porous layer of the present invention preferably has an average pore size of 200 nm or less. When the average pore size is small, flooding is unlikely to occur because a starting point for aggregation of water vapor hardly occurs. When the process of applying a catalyst coating liquid on a micro-porous layer to form a catalyst layer is employed, the catalyst coating liquid hardly permeates the micro-porous layer and can be applied uniformly. Although the lower limit is not particularly limited, the average pore size is preferably 10 nm or more, through which a reaction gas can easily pass. The average pore size can be controlled by the size of the conductive material and a degree of dispersion.

In the present invention, the average pore size of the micro-porous layer means a value measured by a mercury intrusion method, and is a value calculated by setting a surface tension σ of mercury to 480 dyn/cm and a contact angle between mercury and the micro-porous layer to 140°. The measurement by the mercury intrusion method can be performed using, for example, Pore Master (manufactured by Quantachrome Instruments).

The micro-porous layer in an embodiment of the present invention is a micro-porous structure containing a conductive material and a fluororesin as its binder.

The micro-porous layer preferably has a thickness of 100 μm or less. If the thickness of the micro-porous layer exceeds 100 μm, the diffusibility (permeability or water drainability) of gas or water of the gas diffusion electrode substrate itself may be reduced, or electrical resistance may be increased. The thickness of the micro-porous layer is preferably 80 μm or less, more preferably 40 μm or less, from the viewpoint of enhancing gas permeability and water drainability, or reducing electrical resistance, and the thickness of the micro-porous layer is preferably 15 μm or more in order to cover roughness of the conductive porous substrate, in consideration of porosity, pore size and water repellency of a general conductive porous substrate.

In the present invention, the thickness of the micro-porous layer refers to a value calculated by observing a cross section and is obtained by, for example, a method of cutting the micro-porous layer or a gas diffusion electrode substrate, stacked with the micro-porous layer, in a through-plane direction by using an ion milling device, observing the perpendicular cross section (cross section in the through-plane direction) with SEM, and calculating the thickness from the SEM image. As the ion milling device, for example, IM4000 (manufactured by Hitachi High-Technologies Corporation) can be used.

The present invention according to exemplary embodiments provides a micro-porous layer containing a fibrous carbide having a fiber diameter of 5 nm or more and 10 µm or less and an aspect ratio of 10 or more, and in this micro-porous layer, an oxygen/carbon element ratio of the carbide is 0.02 or more.

The micro-porous layer of the present invention preferably contains a fibrous carbide having a fiber diameter of 5 nm or more and 10 µm or less and an aspect ratio of 10 or more. The carbide may be a carbide remaining when a crack suppressing material is decomposed and removed. The oxygen/carbon element ratio of the carbide in the micro-porous layer is preferably 0.02 or more. When the oxygen/carbon element ratio of the carbide is 0.02 or more, crystallinity of the carbide is low, and the carbide may be flexible. Therefore, even if the aspect ratio is 10 or more, the carbide may hardly pierce into the electrolyte membrane.

The aspect ratio of the carbide is preferably 10 or more, more preferably 100 or more, because an increase in the aspect ratio can be expected to improve a reinforcing effect. For this reason, the shape of the carbide is preferably fibrous, a smaller fiber diameter is better, and the fiber diameter is preferably 1 µm or less, more preferably 0.1 µm or less. The fiber diameter of the fibrous carbide is preferably 5 nm or more and 100 nm or less, because the carbide hardly pierces into the electrolyte membrane. The fiber diameter of the fibrous carbide is preferably 500 nm or more and 10 µm or less, because an effect of suppressing cracks can be easily obtained. The fiber diameter may be in a range between any two of the above upper and lower limits.

The fluorine/carbon element ratio of the carbide is preferably smaller than an average fluorine/carbon element ratio of the micro-porous layer. When the fluorine/carbon element ratio of the carbide is smaller than the average fluorine/carbon element ratio of the micro-porous layer, drying of the electrolyte membrane is suppressed, and power generation performance at high temperatures is improved.

The cross section of the micro-porous layer of the present invention preferably contains the carbides in an amount of $1,000/mm^2$ or more. When the carbide is contained in an amount of $1,000/mm^2$ or more, the effect of suppressing cracks is easily obtained. The micro-porous layer of the present invention preferably contains carbon black, a water-repellent substance, and the carbide. When carbon black, a water-repellent substance, and the carbide are contained, a water-repellent structure having an average pore size of 10 to 200 nm can be formed uniformly, and the power generation performance and durability are improved. As such a carbide, for example, a carbide obtained by heat-treating an acrylic resin, a styrene resin, cellulose, starch, a polylactic acid resin, or the like can be used. The carbide in the micro-porous layer in an embodiments of the present invention does not include fibrous carbon having an aspect ratio of 20 or more, which is a conductive material.

<Conductive Material>

In the present invention, a conductive material constituting the micro-porous layer preferably has an aspect ratio of less than 20. When the aspect ratio is 20 or more, cracks are unlikely to occur during drying and sintering because the conductive materials are more easily hooked on each other as compared to a case where the aspect ratio is less than 20, but more than that, fibrous carbon having an aspect ratio of 20 or more is likely to pierce into an electrolyte membrane, which may cause local short circuit. When the fibrous carbon having an aspect ratio of 20 or more is used, a pore size in the micro-porous layer tends to be large as compared to that in the case of using the same volume of the particle-shaped conductive material. When the process of applying a catalyst coating liquid on the micro-porous layer to form a catalyst layer is employed, the catalyst coating liquid may not be able to be applied uniformly. For these reasons, the aspect ratio is preferably 15 or less, more preferably 10 or less, still more preferably 2 or less.

As such a conductive material, it is possible to select a material having conductivity, such as carbon black, carbon nanotubes, carbon nanofibers, chopped carbon fibers, graphene and graphite, and carbon black is suitably used in terms of small aspect ratio, price, reliability in the aspect of health, and product quality stability. Acetylene black is suitably used from the viewpoint that it contains slight amount of impurities and thus hardly lowers the activity of the catalyst. When the cross section is observed with a scanning electron microscope, if fibrous carbon having an aspect ratio of 20 or more cannot be confirmed in an arbitrarily selected visual field exceeding a 5 µm square, it is judged that the fibrous carbon having an aspect ratio of 20 or more is not contained, and when the fibrous carbon having an aspect ratio of 20 or more can be confirmed in any observation visual field, it is judged that the fibrous carbon having an aspect ratio of 20 or more is contained.

The aspect ratio in the present invention means an average length (µm)/average diameter (µm) when the conductive material is fibrous carbon. The average length is an average value determined by taking a photograph at a magnification of 1,000 or more, under a microscope such as a scanning electron microscope or a transmission electron microscope, randomly selecting 10 different fibrous carbons, and measuring their lengths. The average diameter is an average value of 10 fibrous carbons determined by taking a photograph at a magnification of 10,000 or more, under a microscope such as a scanning electron microscope or a transmission electron microscope, randomly selecting 10 different fibrous carbons, measuring a length (width) in a direction perpendicular to a fiber axis direction every 0.5 µm length in the fiber axis direction, and taking the average value as its diameter. When the conductive material is a plate-like material, it means average particle size (µm)/average thickness (µm).

The average particle size is a 50% cumulative diameter on a volume basis determined by measuring by use of a laser diffraction particle size analyzer. The average thickness is an average value determined by taking a photograph at a magnification of 10,000 times or more, under a microscope such as a scanning electron microscope or a transmission electron microscope, randomly selecting 10 different objects, and measuring their thicknesses. In the case of carbon black, the average thickness means minimum circumscribed circle diameter (µm)/maximum inscribed circle diameter (µm) of primary particles. The minimum circumscribed circle diameter and the maximum inscribed circle diameter are average values determined by taking a photograph at a magnification of 10,000 times or more, under a microscope such as a scanning electron microscope or a transmission electron microscope, randomly selecting 10 different carbon blacks, and measuring their sizes. As such a scanning electron microscope, for example, S-4800 (manufactured by Hitachi, Ltd.) can be used. In the present invention, those having an aspect ratio exceeding 20 can be uniformly treated as >20.

<Water-Repellent Substance>

The micro-porous layer of the present invention preferably contains a water-repellent substance including a fluorine compound for a binder function for bonding the above-described conductive materials to each other, suppression of aggregation of water vapor, water drainage, moisture retention, and thermal conductivity. Examples of the fluorine compound contained in the micro-porous layer include polymeric materials such as a polytetrafluoroethylene (PTFE), a tetrafluoroethylene-hexafluoropropylene copolymer (FEP), a tetrafluoroethylene-perfluoroalkylvinylether copolymer (PFA), and an ethylene-tetrafluoroethylene copolymer (ETFE).

In the present invention, the above-described water-repellent substance preferably has a melt viscosity of $10^9$ Pa·s or less, more preferably $10^7$ Pa·s or less, still more preferably $10^5$ Pa·s or less. This is because the polymeric material has a low melt viscosity, whereby a rate of wetting and spreading on a carbon fiber surface during a sintering step is high, so that excellent water repellency can be obtained. This makes it easier to suppress the aggregation of water vapor, and, when the process of applying a catalyst coating liquid on the micro-porous layer to form a catalyst layer is employed, the catalyst coating liquid can be uniformly applied. Such a water-repellent substance can be controlled by a molecular weight and a type of a compound, and, for example, FEP is a preferable embodiment. The melt viscosity mentioned here refers to a viscosity at 380° C.

<Gas Diffusion Electrode Substrate>

The micro-porous layer of the present invention may be used as a gas diffusion electrode substrate only with the micro-porous layer, but it is generally preferable to use the micro-porous layer integrally on a conductive porous substrate. Here, preferable examples of the conductive porous substrate include porous substrates containing carbon fibers, such as a carbon fiber woven fabric, a carbon fiber paper-making material, a carbon fiber nonwoven fabric, carbon felt, carbon paper, and carbon cloth, and metal porous substrates such as a foamed sintered metal, a metal mesh, and an expanded metal. In particular, a porous substrate including a carbon fiber, such as a carbon felt, a carbon paper or a carbon cloth, is preferably used because it is excellent in corrosion resistance, and further, a substrate containing carbide obtained by binding a carbon fiber papermaking material with a carbide, i.e. a carbon paper is preferably used because it is excellent in property of absorbing a change in dimension of an electrolyte membrane in a thickness direction, i.e. "spring property".

In the present invention, from the viewpoint of enhancing gas diffusibility, it is preferable to reduce a thickness of a conductive porous substrate such as carbon paper. In other words, the thickness of the conductive porous substrate such as carbon paper is preferably 220 μm or less, more preferably 150 μm or less, particularly preferably 120 μm or less. However, if the thickness is too small, mechanical strength becomes weak, and the thickness is usually preferably 70 μm or more to facilitate handling in a manufacturing step.

It is also a preferable embodiment that the conductive porous substrate in the present invention is subjected to a water repellent finishing for the purpose of improving water drainability. The water-repellent substance used here may be the same as or different from that described above.

<Fuel Battery>

A unit cell of the solid polymer electrolyte fuel battery is typically constituted of a polymer electrolyte membrane, a catalyst layer formed on each side of the polymer electrolyte membrane, a gas diffusion electrode substrate formed outside the catalyst layer, and two separators sandwiching them. The micro-porous layer according to embodiments of the present invention is usually disposed on a surface in contact with the catalyst layer as a part of the gas diffusion electrode substrate or the gas diffusion electrode substrate itself.

<Method for Manufacturing Micro-Porous Layer>

Preferable examples of a method for manufacturing the micro-porous layer of the present invention includes a method of drying ink containing a conductive material having an aspect ratio of less than 20 and a crack suppressing material having an aspect ratio of 2 or more, then performing a heat treatment at a temperature higher than the drying temperature, and decomposing and removing the crack suppressing material.

As a preferable method of forming a micro-porous layer, there is a method of applying a coating solution for micro-porous layer formation (hereinafter referred to as a micro-porous layer coating solution) by screen printing, rotary screen printing, spraying, intaglio printing, gravure printing, die coating, bar coating, blade coating, knife coating, or the like.

The micro-porous layer coating solution contains the above-described conductive material having an aspect ratio of less than 20 and a water-repellent substance, and, in the present invention, the micro-porous layer coating solution preferably contains the above-described conductive material having an aspect ratio of less than 20 and a crack suppressing material having an aspect ratio of 2 or more.

The crack suppressing material having an aspect ratio of 2 or more according to an embodiment of the present invention is decomposed and removed by heat treatment at a temperature higher than a drying temperature described below, and functions as a crack suppressing material that enters a conductive material during drying and provides a crack suppressing effect. Since the crack suppressing material is decomposed and removed in a subsequent step, there is no problem such as piercing into an electrolyte membrane, and a water repellent function of the water-repellent substance is not hindered; therefore, a micro-porous layer with high contact angle can be obtained in the present invention. Here, "temperature higher than the drying temperature" refers to a temperature higher than the highest temperature reached during drying. The "temperature higher than the drying temperature" is preferably higher than the drying temperature by 50° C. or more.

The content of the crack suppressing material according to the present invention having an aspect ratio of 2 or more in the micro-porous layer coating solution is preferably 50% by mass or less, more preferably 30% by mass or less, still more preferably 15% by mass or less with respect to the conductive material weight. This is because it is possible to reduce a risk that an amount of the crack suppressing material that cannot be completely decomposed and removed by heat treatment pierces into the electrolyte membrane. The content is preferably 0.5% by mass or more, because the effect of suppressing cracks is easily obtained, and the content is more preferably 1% by mass or more, still more preferably 3% by mass or more.

The aspect ratio of the crack suppressing material according to the present invention is preferably 10 or more, more preferably 100 or more, because an increase in the aspect ratio can be expected to improve a reinforcing effect. For this reason, the shape of the crack suppressing material is preferably fibrous. A smaller fiber diameter is better from the viewpoint of dispersibility, uniformity, and surface smoothness after decomposition removal, and, for example, the fiber diameter is preferably 1 µm or less, more preferably 0.1 µm or less.

The micro-porous layer coating solution according to the present invention may contain a dispersion medium such as water or an organic solvent, or may contain a dispersion aid such as a surfactant. A concentration of the conductive material in the micro-porous layer coating solution is preferably 5% by mass or more from the viewpoint of productivity. Water is preferred as the dispersion medium, and a nonionic surfactant is more preferably used as the dispersion aid.

It is preferable that the crack suppressing material according to the present invention have heat resistance at 150° C. and be decomposed and removed at 420° C. This is because a temperature at which the micro-porous layer coating solution is dried is usually 70 to 150° C. if the dispersion medium is water, and a usual water-repellent substance (for example, fluororesin) is decomposed and removed at a temperature of 420° C. or lower, as a temperature at which the water-repellent substance does not deteriorate or is not decomposed and removed. As a raw material of such a crack suppressing material, for example, an acrylic resin, a styrene resin, cellulose, starch, a polylactic acid resin, or the like can be used. In the present invention, the decomposition removal is preferably reduced to 50% by weight or less, more preferably to 30% by weight or less.

The micro-porous layer coating solution in an embodiment of the present invention is applied on a conductive porous substrate and dried by the method described above. At this time, in order to apply the micro-porous layer coating solution smoothly, it is generally said that it is preferable that the porosity of the conductive porous substrate be small and the pore size be small; however, there is a problem that the gas diffusibility is low. Since the micro-porous layer coating solution in an embodiment of the present invention contains a crack suppressing material having an aspect ratio of 2 or more in the solution, penetration into the conductive porous substrate tends to be suppressed, and it is possible to use a conductive porous substrate which has a relatively large porosity and a large pore size and is excellent in gas diffusibility.

As a density of the conductive porous substrate, for example, 0.35 g/cm$^3$ or less is a preferable embodiment under use (power generation) conditions in which gas diffusibility is regarded as important, and 0.30 g/cm$^3$ or less is more preferable. On the other hand, since an excellent conductivity can be obtained when the density is high, 0.40 g/cm$^3$ or more is a preferable embodiment under use (power generation) conditions in which conductivity is regarded as important, and 0.45 g/cm$^3$ or more is more preferable. The density of the substrate in the present invention is a value calculated from a mass measured in a 10 cm square and a thickness obtained by using a micrometer in a pressed state at a surface pressure of 0.15 MPa.

After applying and drying the micro-porous layer coating solution on the conductive porous substrate, the crack suppressing material is decomposed and removed. This step may be performed in the same manner as the drying step. That is, this step may be performed by directly increasing the temperature from the temperature during drying, or may be performed in another step. It is preferable that the crack suppressing material be decomposed and removed at a temperature at which the water-repellent substance is not decomposed and removed, and a temperature at which a water repellent is melted and uniformly adhered, and, in addition, it is preferable that the dispersion aid be decomposed and removed. For this reason, heating to 300 to 400° C. in air is preferred, and heating to 360 to 400° C. is a more preferable embodiment.

<Method for Manufacturing Fuel Battery>

The method for manufacturing a fuel battery using the micro-porous layer of the present invention has two preferable embodiments. As one of the preferable embodiments, a catalyst layer formed on a film is transferred to the polymer electrolyte membrane to produce a polymer electrolyte membrane with the catalyst layer, and the produced polymer electrolyte membrane is sandwiched by a gas diffusion electrode substrate with a micro-porous layer formed on one surface to produce a fuel battery. In this embodiment (referred to as the CCM method in the present invention), the catalyst layer can be formed smoothly. As the other preferable embodiment (referred to as the GDE method in the present invention), a catalyst layer ink is applied on a gas diffusion electrode substrate with a micro-porous layer formed on one surface to produce a gas diffusion electrode substrate with the catalyst layer, and a polymer electrolyte membrane is sandwiched therebetween to produce a fuel battery. This embodiment is excellent in productivity, because the transfer step can be omitted.

EXAMPLES

Hereinafter, the present invention will be concretely described by way of examples.

<Evaluation>

A. Number of Cracks

Using a digital microscope DMS1000 (manufactured by Leica Microsystems), a region larger than a 1 mm square magnified 100 or more times was observed, the number of cracks having a length of 100 µm or more was measured in 10 visual fields, the number was calculated as the number per 1 cm$^2$.

B. Contact Angle

Dropped were 5 µL of water droplets obtained by mixing 2-propanol and water at a ratio of 1:2 at randomly selected 10 locations on the micro-porous layer in an environment of a temperature of 20° C. and a humidity of 60%, and an average value measured every dropping at each location by an automatic contact angle meter DM-501 (manufactured by Kyowa Interface Science, Co., Ltd.) was defined as the contact angle.

C. Average Pore Size of Micro-Porous Layer

Measurement was performed using Pore Master (manufactured by Quantachrome Instruments), and calculation was performed assuming that the surface tension σ of mercury was 480 dyn/cm and the contact angle between mercury and the micro-porous layer was 140°.

D. Short Circuit

The gas diffusion electrode substrates produced in Examples and Comparative Examples were layered on a polymer electrolyte membrane having a thickness of 25 µm, a voltage of 2 V was applied to both sides thereof while applying a pressure of 5 MPa, and an amount of current was measured. This process was repeated 10 times while changing the sample, and a value obtained by dividing the average value by one measurement area was defined as a short-circuit current density.

E. Power Generation Performance (CCM Method)

The gas diffusion electrode substrate was sandwiched on both sides of an electrolyte membrane/catalyst layer integrated product (electrolyte membrane "Gore Select (registered trademark)" manufactured by W. L. Gore & Associates G. K. and catalyst layers "PRIMEA (registered trademark)"

manufactured by W. L. Gore & Associates G. K. formed on both surfaces of the electrolyte membrane) so that each catalyst layer would come into contact with each microporous layer, and the laminate was hot-pressed to prepare a membrane electrode assembly (MEA). This membrane electrode assembly was incorporated into a single cell for a fuel battery, and power generation was performed at a battery temperature of 80° C., a fuel utilization efficiency of 70%, and an air utilization efficiency of 40%, with hydrogen on the anode side and air on the cathode side being humidified to have dew points of 70° C. and 70° C., respectively. A voltage at a current density of 1.5 A/cm$^2$ was measured.

F. Power Generation Performance (GDE Method)

A catalyst liquid containing a platinum carrying carbon (manufactured by Tanaka Kikinzoku Kogyo K. K., platinum carrying amount: 50% by mass), purified water, "Nafion" (registered trademark) solution (manufactured by Sigma-Aldrich Japan, "Nafion" (registered trademark), 5.0% by mass) and isopropyl alcohol (manufactured by Nacalai Tesque, Inc.) was applied on the micro-porous layer to obtain a gas diffusion electrode substrate with a catalyst layer. An electrolyte membrane ("Nafion" (registered trademark) manufactured by DuPont) was sandwiched by the gas diffusion electrode substrate with a catalyst layer, and hot pressed to prepare a membrane electrode assembly (MEA). This membrane electrode assembly was incorporated into a single cell for a fuel battery, and power generation was performed at a battery temperature of 80° C., a fuel utilization efficiency of 70%, and an air utilization efficiency of 40%, with hydrogen on the anode side and air on the cathode side being humidified to have dew points of 70° C. and 70° C., respectively. A voltage at a current density of 1.5 A/cm$^2$ was measured.

G. Analysis of Carbide

The oxygen/carbon element ratio and the fluorine/carbon element ratio of carbide were determined as follows. A sample for observation of a cross section in a thickness direction of the gas diffusion electrode substrate produced by the ion milling device was used, and scanning electron microscope (SEM)-EDX measurement was performed under the conditions of an acceleration voltage of 10 kV and a magnification of 100,000 times to obtain the average fluorine/carbon element ratio as an average of the micro-porous layer, the oxygen/carbon element ratio on carbide, and the fluorine/carbon element ratio on carbide.

For the fiber diameter of the carbide, a carbide portion was measured by a scanning electron microscope (SEM) at a magnification of 5,000 to 100,000 times using the sample for cross-sectional observation described above, and an average value of the measurement results of 10 carbides was defined as the fiber diameter.

An amount of the carbide (number per unit area) was obtained by measuring the number of carbides, which were contained in five visual fields of 20 μm square and satisfied a condition that the fiber diameter was 5 nm or more and 10 μm or less, the aspect ratio was 10 or more, and the oxygen/carbon element ratio was 0.02 or more, using the sample for cross-sectional observation described above and diving the number by a total of measurement areas. S-4800 manufactured by Hitachi, Ltd. was used as a scanning electron microscope, and EX-220SE manufactured by Horiba, Ltd. was used as an energy dispersive X-ray analyzer. As the ion milling device, IM4000 (manufactured by Hitachi High-Technologies Corporation) was used. In Table 2, when carbide satisfying the above conditions was found, carbide judgement was rated "Good", and when the carbide satisfying the above conditions was not found, carbide judgement was rated "No".

Example 1

Carbon black (CB) having a primary particle size of 35 μm and an aspect ratio of 1.1 as a conductive material, FEP having a melt viscosity at 380° C. of 5×10$^3$ Pa·s as a water-repellent substance, pulp having an aspect ratio exceeding 20 and a fiber diameter of 21 μm as a crack suppressing material, a surfactant, and purified water as a dispersion medium were mixed and adjusted such that CB/water-repellent substance/crack suppressing material/surfactant/purified water=7 parts by mass/3 parts by mass/1 part by mass/14 parts by mass/75 parts by mass to prepare a micro-porous layer coating solution.

The micro-porous layer coating solution was applied onto a water-repellent treated carbon paper having a substrate thickness of 200 μm and a substrate density of 0.3 g/cm$^3$ by using a slit die coater and dried at 120° C., followed by heat treatment at 380° C., thus obtaining a gas diffusion electrode substrate.

Table 1 shows evaluation results of the obtained gas diffusion electrode substrate.

Table 2 shows results of analyzing a cross section of the obtained gas diffusion electrode substrate.

Example 2

A gas diffusion electrode substrate was obtained in the same manner as in Example 1 except that a water-repellent treated carbon paper having a substrate density of 0.4 g/cm$^3$ was used.

Table 1 shows evaluation results of the obtained gas diffusion electrode substrate.

Table 2 shows results of analyzing a cross section of the obtained gas diffusion electrode substrate.

Example 3

A gas diffusion electrode substrate was obtained in the same manner as in Example 1 except that a rayon fiber having an aspect ratio exceeding 20 and a fiber diameter of 17 μm was used as a crack suppressing material.

Table 1 shows evaluation results of the obtained gas diffusion electrode substrate.

Table 2 shows results of analyzing a cross section of the obtained gas diffusion electrode substrate.

Example 4

A gas diffusion electrode substrate was obtained in the same manner as in Example 1 except that a cellulose nanofiber having an aspect ratio exceeding 20 and a fiber diameter of 0.04 μm was used as a crack suppressing material.

Table 1 shows evaluation results of the obtained gas diffusion electrode substrate.

Table 2 shows results of analyzing a cross section of the obtained gas diffusion electrode substrate.

Example 5

A gas diffusion electrode substrate was obtained in the same manner as in Example 1 except that a PMMA fiber having an aspect ratio exceeding 20 and a fiber diameter of about 15 μm was used as a crack suppressing material.

Table 1 shows evaluation results of the obtained gas diffusion electrode substrate.

Table 2 shows results of analyzing a cross section of the obtained gas diffusion electrode substrate.

Example 6

A gas diffusion electrode substrate was obtained in the same manner as in Example 1 except that carbon black having a primary particle size of 45 μm was used as a conductive material.

Table 1 shows evaluation results of the obtained gas diffusion electrode substrate.

Table 2 shows results of analyzing a cross section of the obtained gas diffusion electrode substrate.

Example 7

A gas diffusion electrode substrate was obtained in the same manner as in Example 1 except that PTFE having a melt viscosity at 380° C. of $1\times10^{12}$ Pa·s was used as a water-repellent substance.

Table 1 shows evaluation results of the obtained gas diffusion electrode substrate.

Table 2 shows results of analyzing a cross section of the obtained gas diffusion electrode substrate.

Comparative Example 1

A gas diffusion electrode substrate was obtained in the same manner as in Example 1 except that polyethylene oxide (PEO) was used as a crack suppressing material. Since PEO was dissolved in water as a dispersion medium and was amorphous, the aspect ratio and the fiber diameter could not be measured.

Table 1 shows evaluation results of the obtained gas diffusion electrode substrate.

Table 2 shows results of analyzing a cross section of the obtained gas diffusion electrode substrate.

No carbide having a fiber diameter of 5 nm or more and 10 μm or less and an aspect ratio of 10 or more was not confirmed.

Comparative Example 2

A gas diffusion electrode substrate was obtained in the same manner as in Example 1 except that a polyimide (PI) having an aspect ratio of 1.1 was used as a crack suppressing material, and dimethylacetamide was used as a dispersion medium without using a surfactant.

Table 1 shows evaluation results of the obtained gas diffusion electrode substrate.

Table 2 shows results of analyzing a cross section of the obtained gas diffusion electrode substrate.

A PI portion after heat treatment had an aspect ratio of 1.1, an oxygen/carbon ratio of 0.03, and a fluorine/carbon ratio equal to the average of the micro-porous layer.

Comparative Example 3

A gas diffusion electrode substrate was obtained in the same manner as in Example 1 except that ultrahigh molecular weight PTFE having a melt viscosity at 380° C. of $1\times10^{14}$ Pa·s was used as a water-repellent substance, and no crack suppressing material was used.

Table 1 shows evaluation results of the obtained gas diffusion electrode substrate.

Table 2 shows results of analyzing a cross section of the obtained gas diffusion electrode substrate.

The aspect ratio of an ultrahigh molecular weight PTFE portion after heat treatment was 1.1, the oxygen/carbon ratio was 0.005, and the fluorine/carbon ratio was larger than that of the micro-porous layer.

Comparative Example 4

A gas diffusion electrode substrate was obtained in the same manner as in Example 1 except that VGCF shown in the table was used as a conductive material and the heating temperature after drying was 350° C.

Table 1 shows evaluation results of the obtained gas diffusion electrode substrate.

Table 2 shows results of analyzing a cross section of the obtained gas diffusion electrode substrate.

A VGCF portion after heat treatment had a fiber diameter of 0.15 μm, an oxygen/carbon ratio of 0.005, an aspect ratio of >20, and a fluorine/carbon ratio equal to the average of the micro-porous layer.

TABLE 1

| | | Material | | | | | | Micro-porous layer physical properties | | | | Evaluation result | |
|---|---|---|---|---|---|---|---|---|---|---|---|---|---|
| | | Conductive material | | Water-repellent substance | | Crack suppressing material | | Substrate | | | | | Performance [CCM] | Performance [GDE] |
| | | Aspect ratio | Primary particle size nm | Type | Melt viscosity Pa·s | Type | Aspect ratio | density g/cm³ | Crack Number/cm² | Contact angle ° | Pore size nm | Short circuit mA/cm² | V | V |
| Example | 1 | 1.1 | 35 | FEP | $5\times10^3$ | Pulp | >20 | 0.3 | 14 | 110 | 70 | 15 | 0.6 | 0.65 |
| | 2 | 1.1 | 35 | FEP | $5\times10^3$ | Pulp | >20 | 0.4 | 5 | 110 | 70 | 14 | 0.57 | 0.62 |
| | 3 | 1.1 | 35 | FEP | $5\times10^3$ | Rayon fiber | >20 | 0.3 | 14 | 110 | 70 | 14 | 0.61 | 0.65 |
| | 4 | 1.1 | 35 | FEP | $5\times10^3$ | CNF | >20 | 0.3 | 15 | 110 | 70 | 13 | 0.6 | 0.65 |
| | 5 | 1.1 | 35 | FEP | $5\times10^3$ | PMMA fiber | >20 | 0.3 | 15 | 110 | 70 | 17 | 0.59 | 0.65 |
| | 6 | 1.1 | 45 | FEP | $5\times10^3$ | Pulp | >20 | 0.3 | 12 | 110 | 280 | 16 | 0.56 | 0.61 |
| | 7 | 1.1 | 35 | PTFE | $1\times10^{12}$ | Pulp | >20 | 0.3 | 13 | 100 | 70 | 16 | 0.6 | 0.65 |

TABLE 1-continued

| | | Material | | | | | | Micro-porous layer physical properties | | | Evaluation result | |
|---|---|---|---|---|---|---|---|---|---|---|---|---|
| | | Conductive material | | Water-repellent substance | | Crack suppressing material | | Sub-strate | | | | |
| | | Aspect ratio | Primary particle size nm | Type | Melt viscosity Pa·s | Type | Aspect ratio | density g/cm³ | Crack Number/ cm² | Contact angle ° | Pore size nm | Short circuit mA/cm² | Perfor-mance [CCM] V | Perfor-mance [GDE] V |
| Comparative Example | 1 | 1.1 | 35 | FEP | 5 × 10³ | PEO | — | 0.3 | 16 | 70 | 70 | 15 | 0.51 | 0.55 |
| | 2 | 1.1 | 35 | FEP | 5 × 10³ | PI | 1.1 | 0.3 | 50 | 70 | 70 | 14 | 0.47 | 0.52 |
| | 3 | 1.1 | 35 | Ultra high molecular weight PTFE | 1 × 10¹⁴ | — | — | 0.3 | 50 | 70 | 70 | 14 | 0.48 | 0.52 |
| | 4 | >20 | 150 | FEP | 5 × 10³ | — | — | 0.3 | 11 | 65 | 560 | 144 | 0.45 | 0.5 |

TABLE 2

| | | Analysis result | | | | | |
|---|---|---|---|---|---|---|---|
| | | Aspect ratio | Oxygen/ carbon | Fiber diameter μm | Amount Number/mm² | Fluorine/carbon | Carbide judgment |
| Example | 1 | >20 | 0.03 | 9 | <1000 | Smaller than average of micro-porous layer | Good |
| | 2 | >20 | 0.03 | 9 | <1000 | Smaller than average of micro-porous layer | Good |
| | 3 | >20 | 0.03 | 6 | <1000 | Smaller than average of micro-porous layer | Good |
| | 4 | >20 | 0.05 | 0.03 | >1000 | Smaller than average of micro-porous layer | Good |
| | 5 | >20 | 0.04 | 9 | <1000 | Smaller than average of micro-porous layer | Good |
| | 6 | >20 | 0.03 | 9 | <1000 | Smaller than average of micro-porous layer | Good |
| | 7 | >20 | 0.03 | 9 | <1000 | Smaller than average of micro-porous layer | Good |
| Comparative Example | 1 | — | — | — | — | — | No |
| | 2 | 1.1 | 0.03 | 3 | >1000 | Same as average of micro-porous layer | No |
| | 3 | 1.1 | 0.005 | 3 | >1000 | Larger than average of micro-porous layer | No |
| | 4 | >20 | 0.005 | 0.15 | >1000 | Same as average of micro-porous layer | No |

The invention claimed is:

1. A gas diffusion electrode substrate in which a micro-porous layer is provided on a conductive porous substrate, wherein the micro-porous layer comprises (i) a fibrous carbide having a Aber diameter of 5 nm or more and 10 μm or less and an aspect ratio of 10 or more and (ii) a conductive material,
wherein an oxygen/carbon element ratio of the whole fibrous carbide is 0.02 or more, and wherein the oxygen/carbon element ratio is measured by performing a scanning electron microscope (SEM)-EDX measurement, under the conditions of an acceleration voltage of 10 kV and a magnification of 100,000 times, on a cross section in a thickness direction of the gas diffusion electrode substrate produced by an ion milling device.

2. The gas diffusion electrode according to claim 1, wherein the carbide has a fiber diameter of 5 nm or more and 100 nm or less.

3. The gas diffusion electrode according to claim 1, wherein the carbide has a fiber diameter of 500 nm or more and 10 μm or less.

4. The gas diffusion electrode according to claim 1, wherein a fluorine/carbon element ratio of the carbide is smaller than an average fluorine/carbon element ratio of the micro-porous layer.

5. The gas diffusion electrode according to claim 1, wherein a cross section of the micro-porous layer contains the carbides in an amount of 1,000/mm² or more.

6. The gas diffusion electrode according claim 1, comprising carbon black, a water-repellent substance, and the carbide.

7. A micro-porous layer having a contact angle with a droplet obtained by mixing 2-propanol and water at a ratio of 1:2 of 80° or more, comprising:
(i) a conductive material having an aspect ratio of les 20, and comprising substantially no crack; and
(ii) a water-repellent substance having a melt viscosity of $10^9$ Pa·s or less.

8. The micro-porous layer according to claim 7, having an average pore size of 200 nm or less.

9. The gas diffusion electrode according to claim 1, wherein the fibrous carbide does not include carbon nano-fiber and milled carbon fiber, and wherein the carbon nano-fiber includes a single-walled carbon nanotube, a multi-walled carbon nanotube, and/or a vapor grown carbon fiber.

10. The gas diffusion electrode substrate according to claim 1, wherein the fibrous carbide is obtained by heat-treating an acrylic resin, a styrene resin, cellulose, starch, or a polylactic acid resin.

11. The gas diffusion electrode substrate according to claim 1, wherein the fibrous carbide is obtained by heat-treating pulp, rayon fiber, cellulose nano fiber (CNF), or PMMA fiber.

12. The gas diffusion electrode substrate according to claim 1, wherein the oxygen/carbon element ratio of the whole fibrous carbide is 0.02 or more and 0.05 or less.

13. A fuel battery comprising a micro-porous layer comprising (i) a fibrous carbide having a fiber diameter of 5 nm or more and 10 μm or less and an aspect ratio of 10 or more and (ii) a conductive material,
wherein an oxygen/carbon element ratio of the whole fibrous carbide is 0.02 or more, and wherein the oxygen/carbon element ratio is measured by performing a scanning electron microscope (SEM)-EDX measurement, under the conditions of an acceleration voltage of 10 kV and a magnification of 100,000 times, on a cross section in a thickness direction of the gas diffusion electrode substrate produced by an ion milling device.

* * * * *